United States Patent
Chang et al.

(10) Patent No.: US 6,814,457 B2
(45) Date of Patent: Nov. 9, 2004

(54) LIGHT GUIDE STRUCTURE FOR LIGHT GUIDE PLATE

(75) Inventors: Shih-Tsung Chang, Taichung Hsien (TW); Chi-Feng Cheng, Taichung Hsien (TW)

(73) Assignee: Taiwan Green Point Enterprise Co., Ltd., Taichung (TW)

( * ) Notice: Subject to any disclaimer, the term of this patent is extended or adjusted under 35 U.S.C. 154(b) by 15 days.

(21) Appl. No.: 10/211,831

(22) Filed: Aug. 5, 2002

(65) Prior Publication Data

US 2004/0022049 A1 Feb. 5, 2004

(51) Int. Cl.⁷ ............................................. F21V 7/04
(52) U.S. Cl. ................................. 362/31; 362/27
(58) Field of Search .................. 362/31, 27, 555, 362/800, 806

(56) References Cited

U.S. PATENT DOCUMENTS 5,797,668 A * 8/1998 Kojima et al. ................ 362/31
6,164,790 A * 12/2000 Lee ................................ 362/31
6,280,043 B1 * 8/2001 Ohkawa ......................... 362/31
2002/0163790 A1 * 11/2002 Yamashita et al. ............ 362/31

* cited by examiner

Primary Examiner—Thomas M. Sember
Assistant Examiner—James Cranson
(74) Attorney, Agent, or Firm—Charles E. Baxley (57) ABSTRACT

The present invention relates to an improvement for a light guide structure for light guide plate so as to resolve the problems of illumination and degree of uniformity of the conventional light guide plate. The light guide plate of the present invention has line-shaped passages which are located in parallel with the direction of light from the light emitting diodes. The depth of the passages becomes deeper gradually from one end to the other, wherein the source of light is located close to the shallow end, thereby the light from the light emitting diodes is transmitted to the remote areas that are located far from the source of light. The present invention increases the total illumination and the degree of uniformity, and the efficiency of the light emitting diode is also increased.

2 Claims, 8 Drawing Sheets

LIGHT GUIDE STRUCTURE FOR LIGHT GUIDE PLATE

FIELD OF THE INVENTION

The present invention relates to an improvement for a light guide structure for light guide plate and which is used on the important industry regarding light guide plate and illuminating products, and is already used in cellular phones, PDAs, and watches. The light guide structure of the light guide plate of the present invention increases the illumination evenly and the efficiency of the light emitting diode.

BACKGROUND OF THE INVENTION

The conventional light guide plate technique employs a high refraction light guide plate and several light emitting diodes (LED). There is a light guide structure in a form of several spots on the light guide plate, and the spots illuminate by the light from the light emitting diodes (the light refraction). The technique is used in the market for a period of time and plays a main role in products of the night light kneading boards. Nevertheless, the conventional technique has the following shortcomings:

1. The efficiency of light guiding of the light guide structure is not satisfied, and the density of the light guide structure is limited (the density of the optimum refraction is fixed and cannot be increased as needs), so that the spots and degree of uniformity on the light guide plate are not satisfied.

2. The spot of the light guide structure has to use expensive V-CUT precision machining (making a V-shaped groove in a single light cable by the precision machining device) to made a mold. The use of the V-CUT increases the manufacturing and the product cost.

SUMMARY OF THE INVENTION

The primary object of the present invention is to provide an improvement for a light guide structure for light guide plate and increase the illumination and the degree of uniformity. Line-shaped passages are defined in the light guide plate and parallel to the direction of the light. The depth of the passage is shallow close to the source of light and gradually deeper close the remote position from the source of light. This allows the light form the light emitting diodes to be transferred to a remote area that is far away from the source of light so as to increase the illumination and the degree of uniformity. The light-guide efficiency of the light emitting diodes can also be further increased.

Another object of the present invention is to provide an improvement for a light guide structure for light guide plate with uses production technique that is less expensive. The present invention makes line-shaped passages for guiding the light on the light guide plate so that the manufacturers do not need to use expensive and precise molds made by V-CUT so that the manufacturing cost can be reduced.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
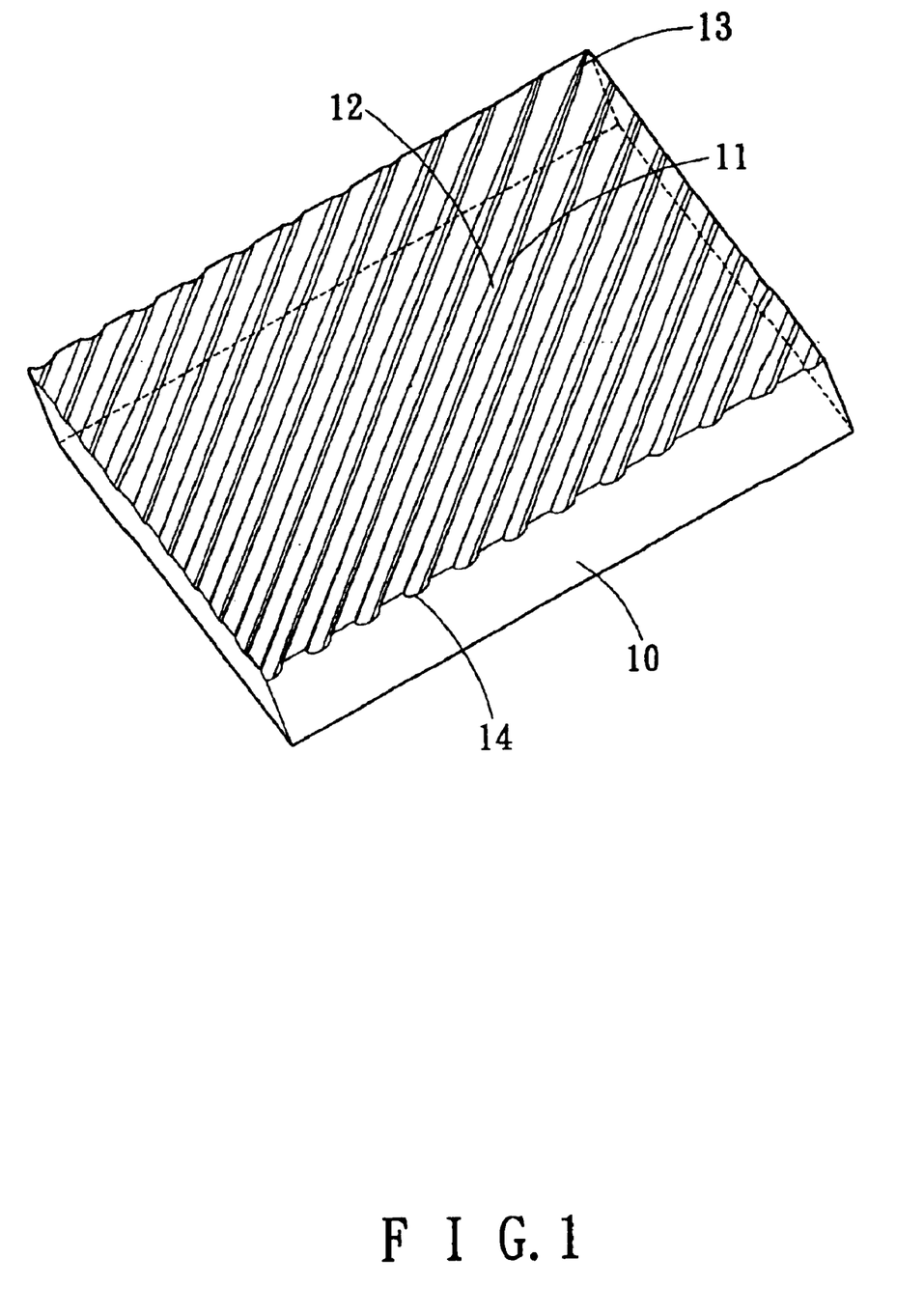
FIG. 1 is a perspective view to show the light guide plate of the present invention.
Figure 2:
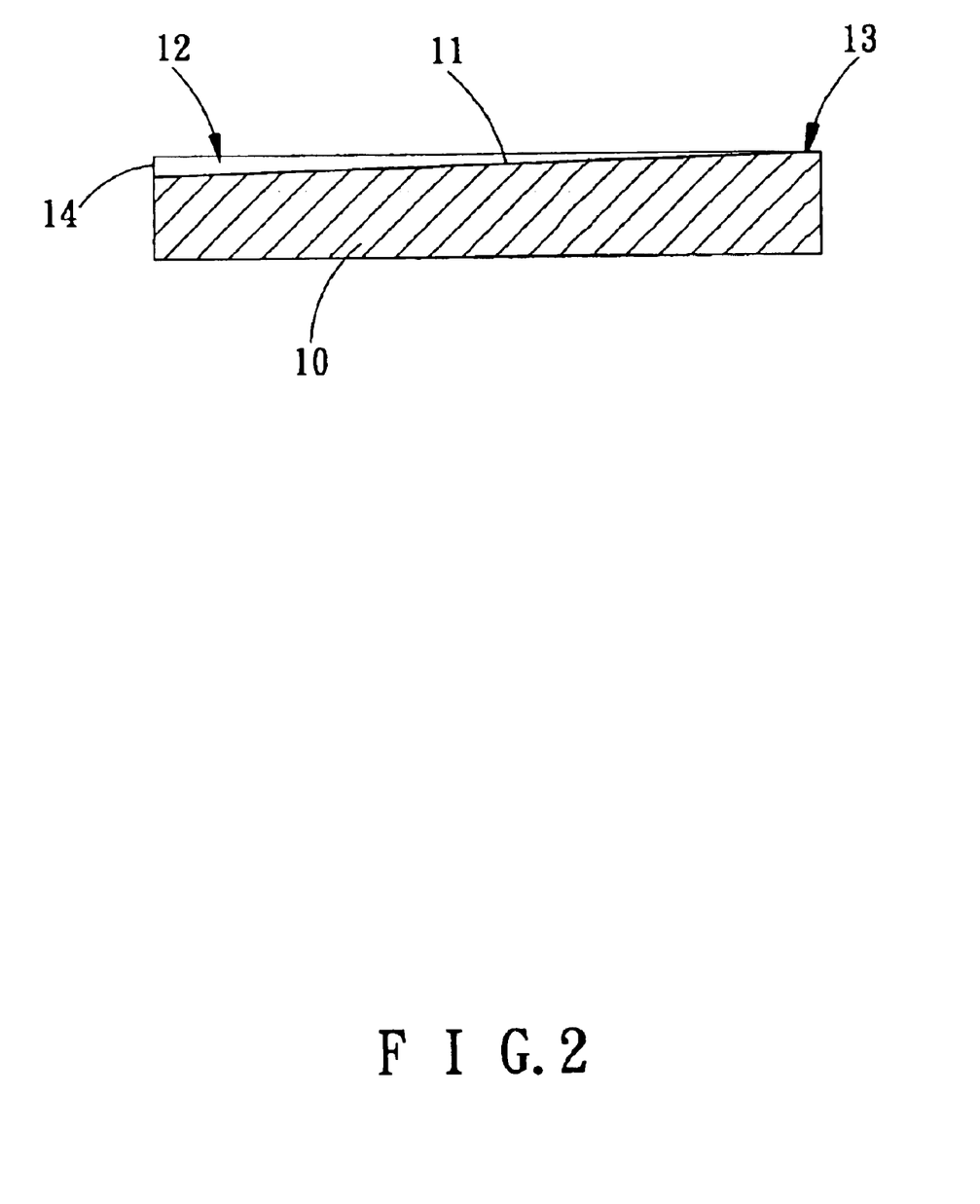
FIG. 2 is a cross sectional view to show the light guide plate of the present invention.
Figure 3:
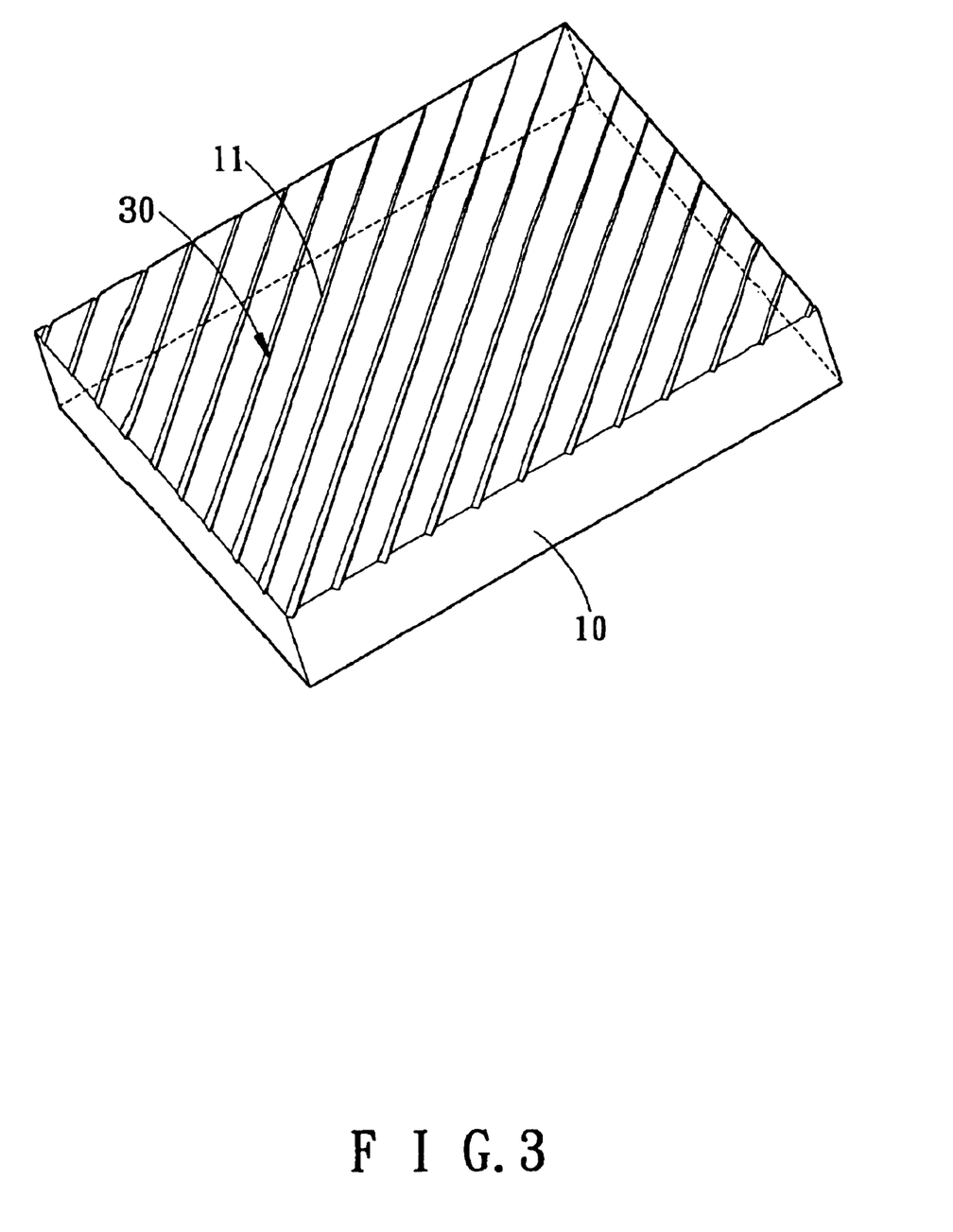
FIG. 3 is a perspective view to show another embodiment of the light guide plate of the present invention.
Figure 4:
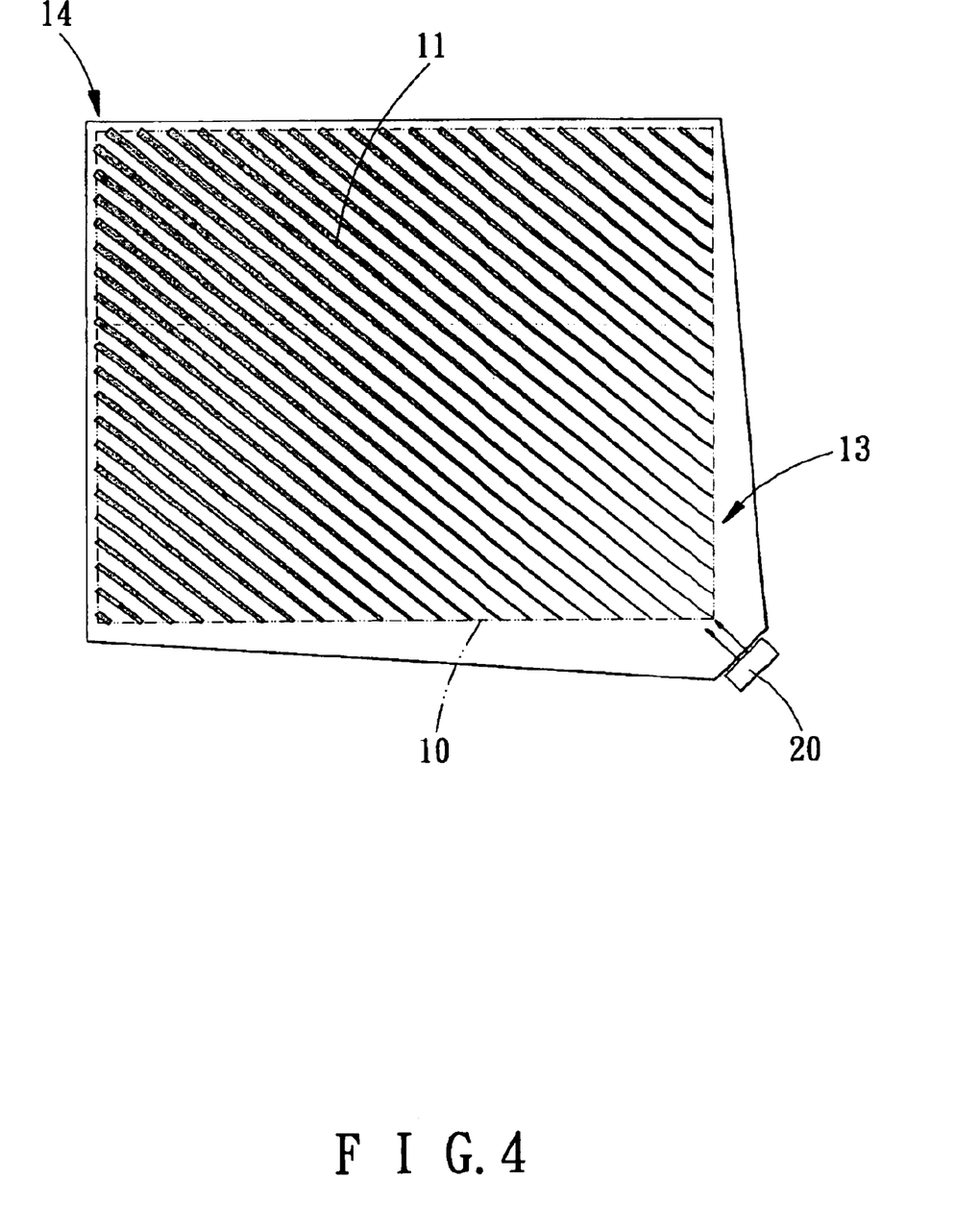
FIG. 4 shows that the light guide plate of the present invention is in an operation status.

Referring to FIGS. 1, 3 and 4, the improvement for a light guide structure for light guide plate comprises a light guide plate 10 which is a transparent plate and light may go through the plate. Several line-shaped passages 11 are defined in the surface of the light guide plate 10 and form a light guide structure. The passages 11 are parallel with each other and each passage 11 has U-shaped refraction surface 12. One end 13 of the passage 11 gradually becomes wider and deeper toward the other end 14.

At least one light emitting diode 20 is connected to a side of the light guide plate 10 and performs as a source of light. The light emitting diodes 20 is located close to the shallow end 13 of the passage 11 and the light of the light emitting diode 20 is parallel with the passages 11.

A preferred embodiment is described for the purpose of clearly interpretation of the present invention, referring to FIG. 4, when the light emitting diode 20 is activated, due to the fact that the light of the light emitting diode 20 is parallel with the passage 11 and located close to the shallow end 13 of the passage 11, the light of the light emitting diode 20 goes through the passages 11 and is refracted by the U-shaped refraction surface 12. The light from the light emitting diode 20 is transmitted to the whole light guide structure of the light guide plate 10, no matter the position on the light guide plate 10 is close to or remote from the source of light. The light is lead form the shallow end 13 and magnified in the deeper end 14 so that the light can be spread evenly and the efficiency of the leading of light of the light emitting diode 20 is increased. The passages 11 in the light guide plate 10 are incorporated with the light emitting diode 20 to increase the illumination of the light guide plate 10 and the degree of uniformity of the light guide structure on the whole light guide plate 10. The efficiency of the leading of light of the light emitting diode 20 is increased.

It is to be noted that the concave line-shaped passages 11 in the light guide plate 10 do not need precision machining such as the expensive V-CUT (making a V-shaped groove with even depth in single light cable by precision machining device) to made the mold so that the manufacturing cost of the light guide plate 10 is less expensive and total cost is then reduced.

Figure 5:
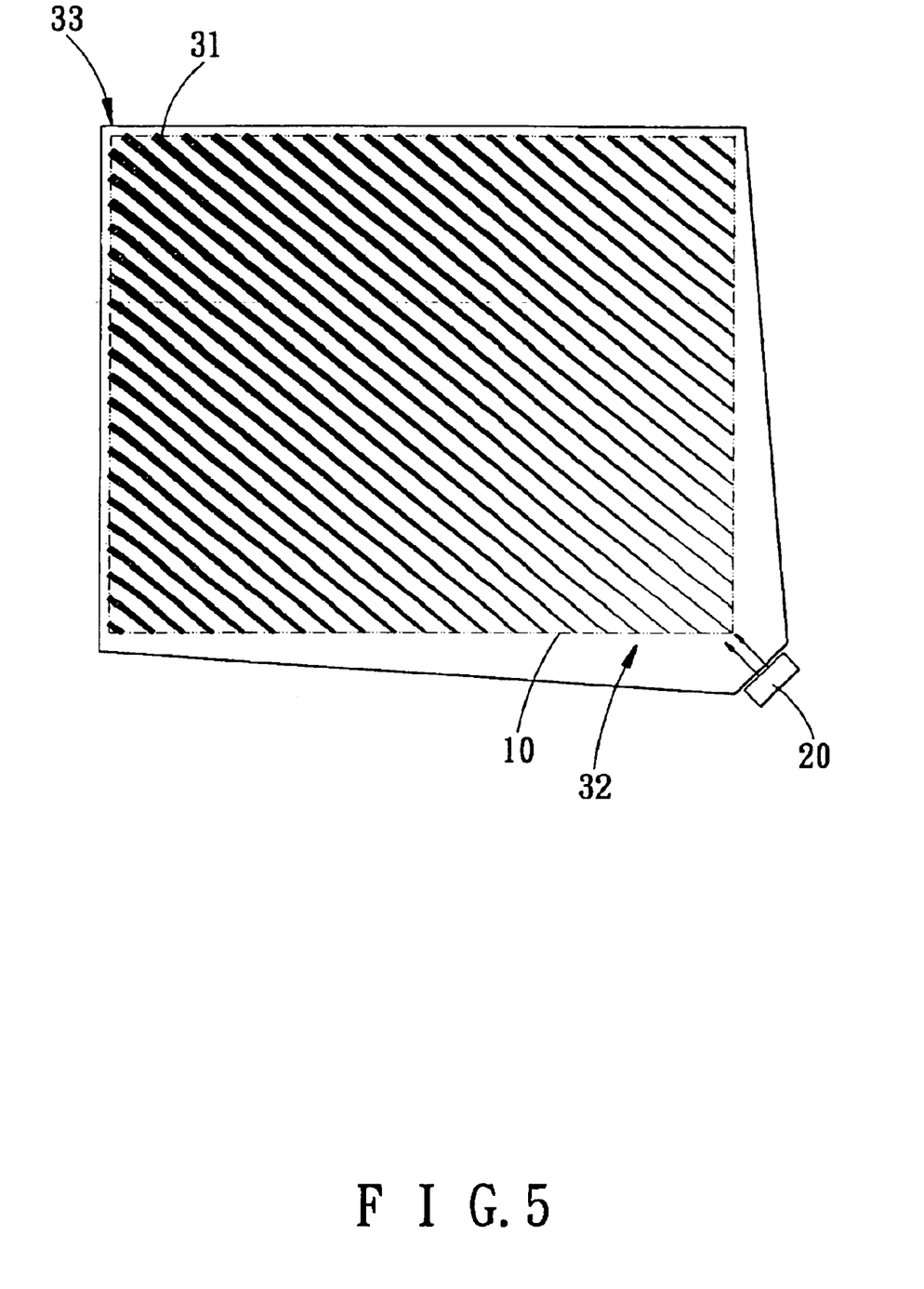
FIG. 5 shows another embodiment of the light guide plate of the present invention.

Referring to FIG. 3, the passages 11 may also be made to be V-shaped and includes V-shaped refraction surface 30 which has various features and should be involved in the scope of the present invention. Referring to FIG. 5, the passages 11 may also be made to be protrusion blocks 31 which are arranged in a certain sequence. The shape of the blocks 31 close to the end 32 of the passage is fine, and is larger gradually when approaching the other end 33. No matter what the shape of the passage 11 is, concave passages, concave passages, or protrusion blocks, the various types of function are in the scope of the present invention.

Figure 6:
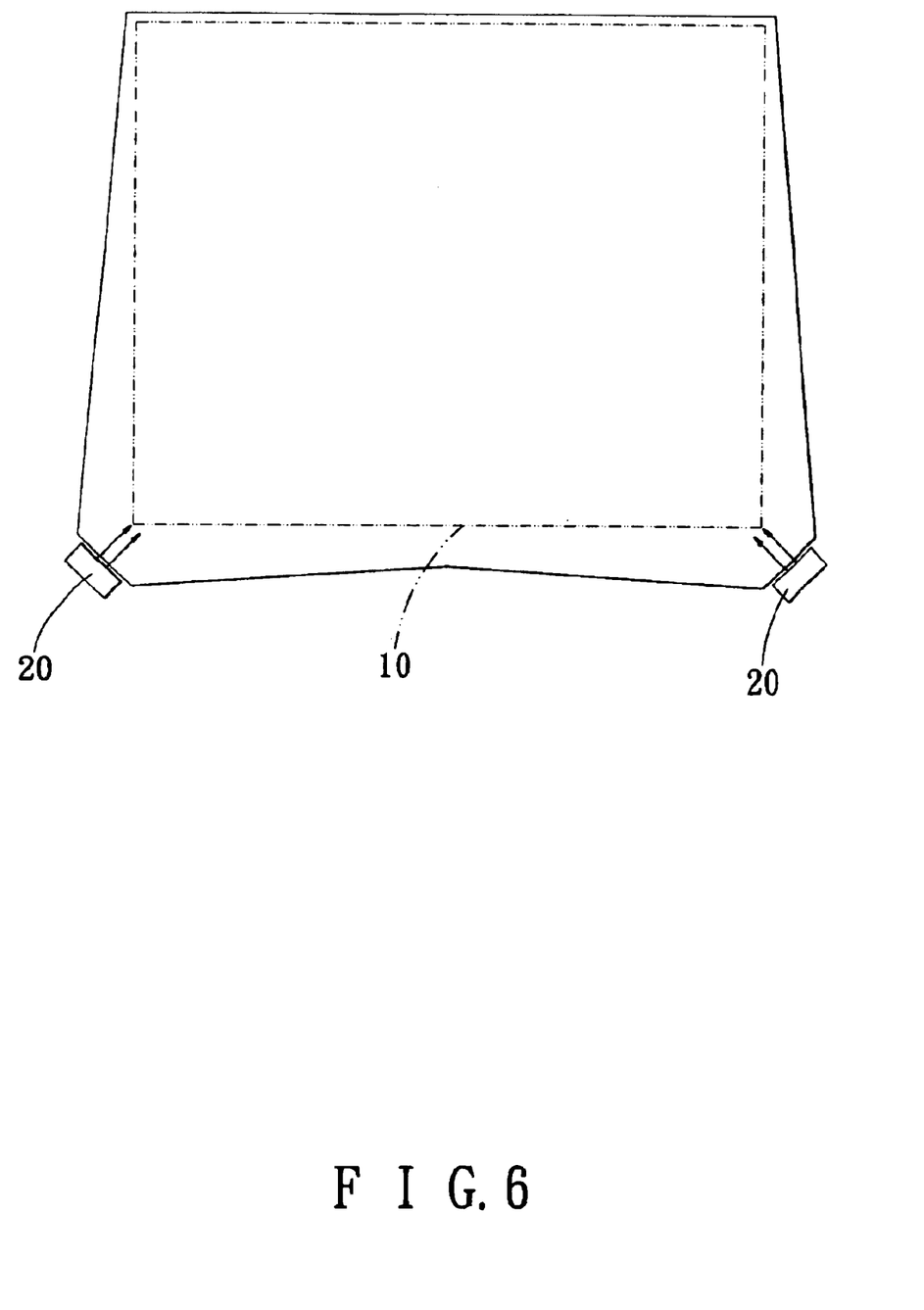
FIG. 6 shows the light emitting diode of the present invention.
Figure 7:
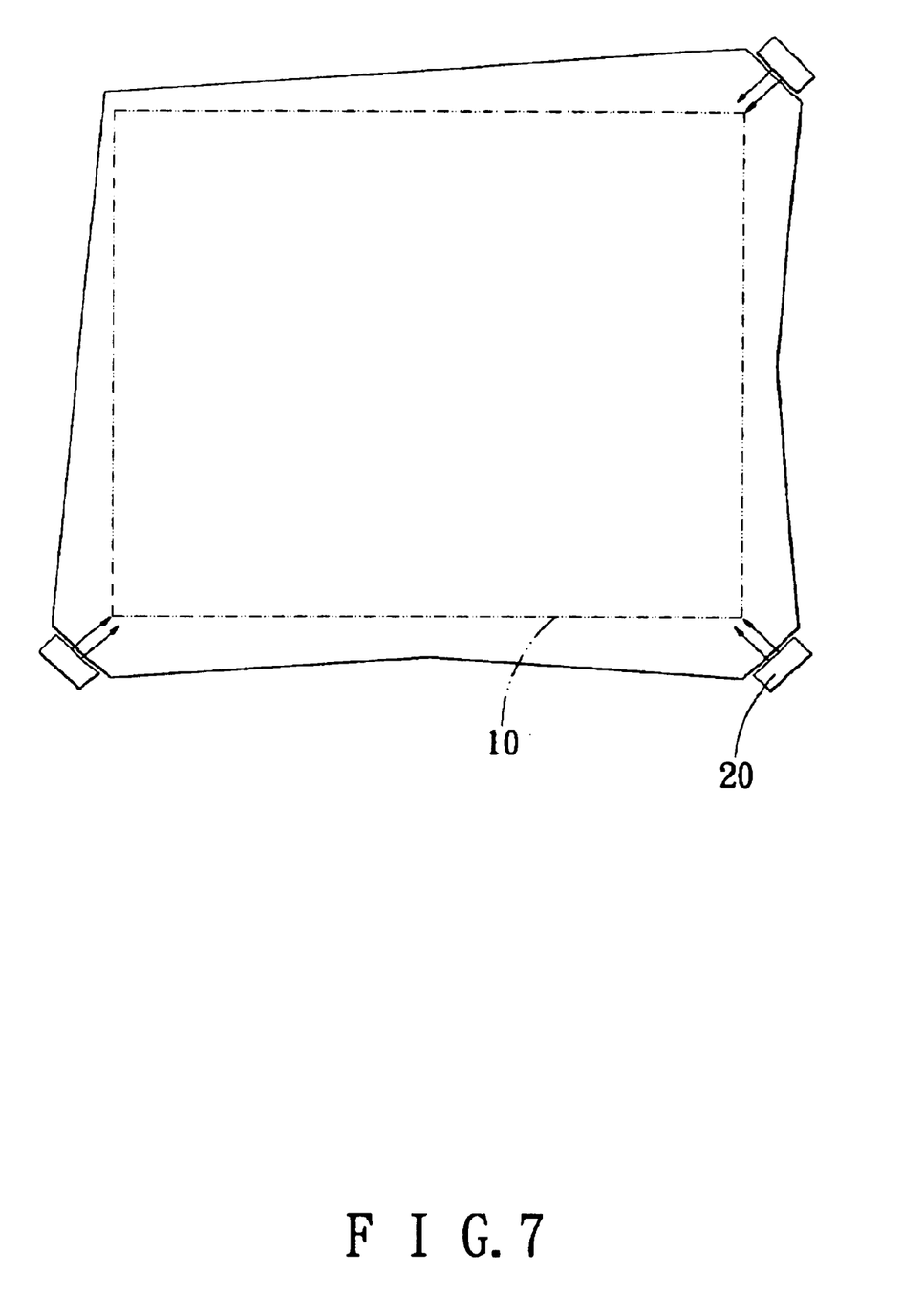
FIG. 7 shows another embodiment of the light emitting diode of the present invention.
Figure 8:
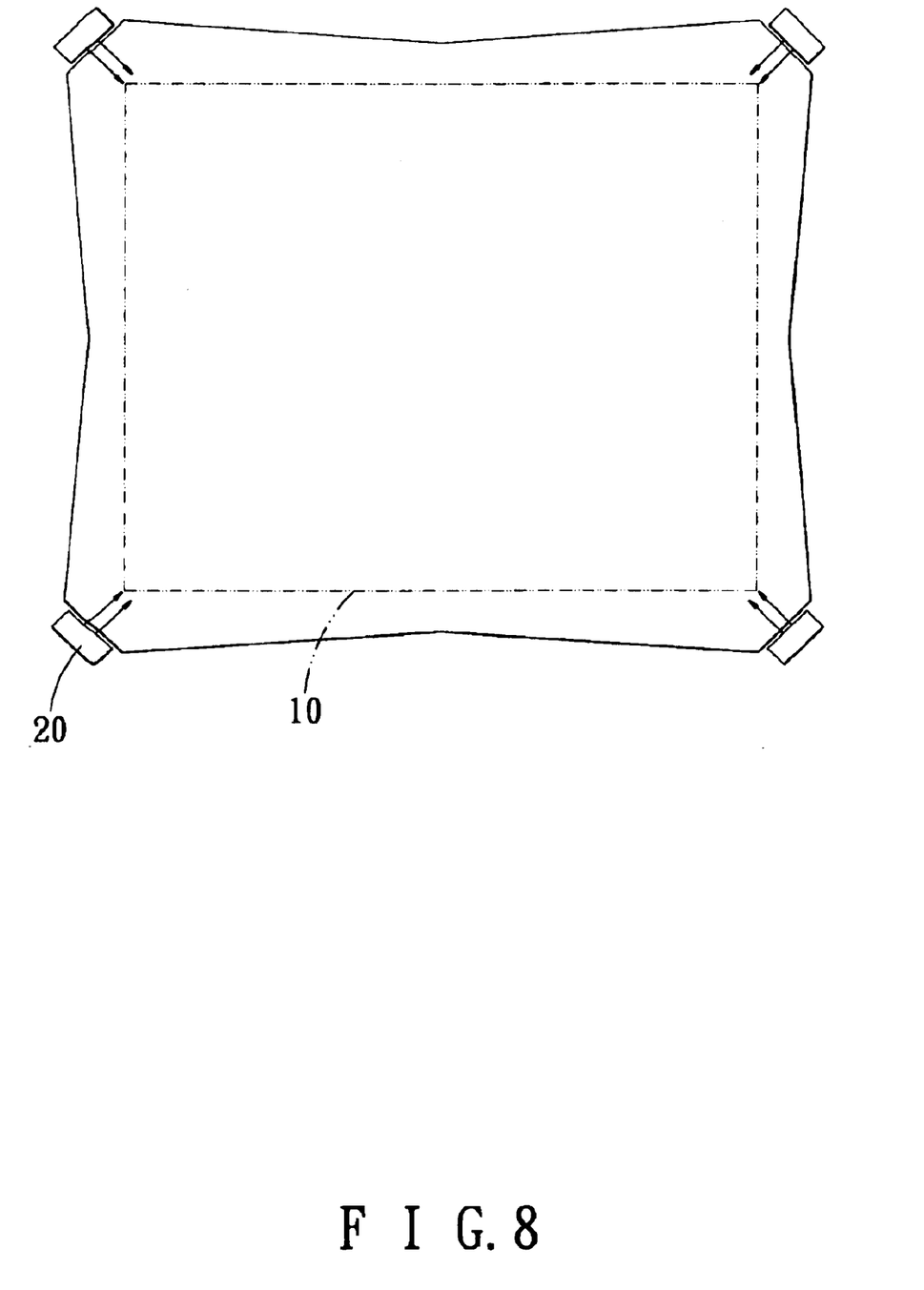
FIG. 8 shows yet another embodiment of the light emitting diode of the present invention.

Referring to FIGS. 6, 7 and 8, the light emitting diodes 20 are located at one end of the line-shaped passages 11, if the passages 11 are arranged in a cruciform arrangement, the light of the light emitting diodes 20 spreads toward two ends of the passages 11 and light changes in the deep and shallow areas in the passages so as to have various types of features. Therefore, the present invention can be used in different ways and different products.

The line-shaped grooves in the light guide plate are located in parallel to the light of the light emitting diodes. The passages has shallow ends close to the source of light and deeper ends located far from the source of light, thereby transmitting the light of the light emitting diodes to remote areas on the light guide plate and increasing the illumination and the degree of uniformity of the light plate.

While we have shown and described the embodiment in accordance with the present invention, it should be clear to those skilled in the art that further embodiments may be made without departing from the scope of the present invention.

What is claimed is:

1. A light guide structure for light guide plate, comprising:

a light guide plate being a transparent plate and a plurality of line-shaped passages defined in a surface of the light guide plate, the passages located in parallel with each other and each passage becoming wider from one end to the other end gradually, and at least one source of light located at a narrow end and a direction of light of the at least one source of light being parallel with the passages.

2. The light guide structure for light guide plate as claimed in claim 1, wherein the passages have several slot-shaped concavities and are deeper from a shallow end to a deeper end.

* * * * *